(12) United States Patent
Butler et al.

(10) Patent No.: US 9,703,398 B2
(45) Date of Patent: Jul. 11, 2017

(54) POINTING DEVICE USING PROXIMITY SENSING

(75) Inventors: David Alexander Butler, Cambridge (GB); Nicolas Villar, Cambridge (GB); John Helmes, Cambridge (GB); Shahram Izadi, Cambridge (GB); Stephen E. Hodges, Cambridge (GB); Daniel Rosenfeld, Seattle, WA (US); Hrvoje Benko, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1346 days.

(21) Appl. No.: 12/485,593

(22) Filed: Jun. 16, 2009

(65) Prior Publication Data

US 2010/0315336 A1    Dec. 16, 2010

(51) Int. Cl.
G06F 3/0354    (2013.01)
G06F 3/01    (2006.01)
G06F 3/03    (2006.01)

(52) U.S. Cl.
CPC .......... *G06F 3/03543* (2013.01); *G06F 3/017* (2013.01); *G06F 3/0304* (2013.01)

(58) Field of Classification Search
CPC ..... G06F 2203/0039; G06F 2203/0382; G06F 2203/0381
USPC .................................................. 345/173–178
See application file for complete search history.

(56) References Cited

U.S. PATENT DOCUMENTS

| 4,568,182 | A | * | 2/1986 | Modjallal | ..................... 356/3.01 |
| 4,841,291 | A | * | 6/1989 | Swix et al. | ................... 345/473 |
| 4,943,806 | A | * | 7/1990 | Masters et al. | ................. 341/31 |
| 5,175,534 | A | | 12/1992 | Thatcher | |

(Continued)

FOREIGN PATENT DOCUMENTS

| GB | PCT/IB2006/001531 | * 11/2007 | ............. G06F 3/041 |
| WO | WO2009006735 A1 | 1/2009 | |

OTHER PUBLICATIONS

Balakrishnan, et al., "The PadMouse: Facilitating Selection and Spatial Positioning for the Non-Dominant Hand", retrieved on May 11, 2009 at <<http://www.dgp.toronto.edu/~ravin/papers/chi98_padmouse.pdf>>, Proceedings of 1998 ACM Conference on Human Factors in Computing Systems (CHI 1998), 1998, pp. 9-16.

(Continued)

*Primary Examiner* — Ilana Spar
*Assistant Examiner* — Mihir K Rayan

(57) ABSTRACT

A pointing device using proximity sensing is described. In an embodiment, a pointing device comprises a movement sensor and a proximity sensor. The movement sensor generates a first data sequence relating to sensed movement of the pointing device relative to a surface. The proximity sensor generates a second data sequence relating to sensed movement relative to the pointing device of one or more objects in proximity to the pointing device. In embodiments, data from the movement sensor of the pointing device is read and the movement of the pointing device relative to the surface is determined. Data from the proximity sensor is also read, and a sequence of sensor images of one or more objects (Continued)

in proximity to the pointing device are generated. The sensor images are analyzed to determine the movement of the one or more objects relative to the pointing device.

20 Claims, 18 Drawing Sheets

(56) References Cited

U.S. PATENT DOCUMENTS

| | | | |
|---|---|---|---|
| 5,270,692 A * | 12/1993 | Rockwell | G06F 3/03543 178/19.01 |
| 5,313,229 A | 5/1994 | Gilligan et al. | |
| 5,612,689 A | 3/1997 | Lee, Jr. | |
| 5,767,842 A * | 6/1998 | Korth | 345/168 |
| 5,796,827 A * | 8/1998 | Coppersmith | A61B 5/0024 380/265 |
| 5,887,995 A * | 3/1999 | Holehan | 400/479.1 |
| 5,897,647 A * | 4/1999 | Kadosawa et al. | 715/210 |
| 6,191,774 B1 | 2/2001 | Schena et al. | |
| 6,204,839 B1 | 3/2001 | Mato, Jr. | |
| 6,323,846 B1 * | 11/2001 | Westerman | G06F 3/0235 345/173 |
| 6,362,811 B1 | 3/2002 | Edwards et al. | |
| 6,489,948 B1 * | 12/2002 | Lau | G06F 3/03543 345/159 |
| 6,570,557 B1 | 5/2003 | Westerman et al. | |
| 6,614,420 B1 | 9/2003 | Han et al. | |
| 6,690,352 B2 | 2/2004 | Cheng et al. | |
| 6,714,189 B2 * | 3/2004 | Collins | G06F 3/03543 345/163 |
| 6,771,161 B1 * | 8/2004 | Doi | B60R 25/2027 340/10.34 |
| 6,954,355 B2 * | 10/2005 | Gerstner et al. | 361/679.09 |
| 7,030,861 B1 | 4/2006 | Westerman et al. | |
| 7,358,956 B2 | 4/2008 | Hinckley et al. | |
| 7,928,965 B2 * | 4/2011 | Rosenblatt et al. | 345/173 |
| 2002/0093486 A1 * | 7/2002 | Gordon | G06F 3/0317 345/166 |
| 2002/0118170 A1 * | 8/2002 | Iaria et al. | 345/163 |
| 2003/0006965 A1 * | 1/2003 | Bohn | G06F 3/03543 345/163 |
| 2003/0076296 A1 | 4/2003 | Kolybaba | |
| 2003/0165048 A1 * | 9/2003 | Bamji et al. | 361/681 |
| 2003/0184520 A1 * | 10/2003 | Wei | G06F 3/03543 345/163 |
| 2004/0001044 A1 * | 1/2004 | Luciani et al. | 345/157 |
| 2004/0227954 A1 * | 11/2004 | Xie | 356/498 |
| 2004/0264851 A1 | 12/2004 | Amiri | |
| 2005/0007343 A1 * | 1/2005 | Butzer | 345/163 |
| 2005/0179650 A1 * | 8/2005 | Ludwig | G06F 3/0346 345/156 |
| 2005/0179657 A1 * | 8/2005 | Russo | G06F 3/038 345/163 |
| 2006/0066588 A1 * | 3/2006 | Lyon | G06F 3/0488 345/173 |
| 2006/0086896 A1 * | 4/2006 | Han | 250/221 |
| 2006/0132440 A1 | 6/2006 | Safai | |
| 2006/0149550 A1 | 7/2006 | Salminen | |
| 2007/0002028 A1 * | 1/2007 | Morrison et al. | 345/173 |
| 2007/0139376 A1 * | 6/2007 | Giles | 345/163 |
| 2007/0159453 A1 * | 7/2007 | Inoue | 345/156 |
| 2007/0236450 A1 | 10/2007 | Colgate et al. | |
| 2008/0010616 A1 | 1/2008 | Algreatly | |
| 2008/0061219 A1 * | 3/2008 | Lee et al. | 250/221 |
| 2008/0106523 A1 | 5/2008 | Conrad | |
| 2008/0174554 A1 * | 7/2008 | Zhao | G06F 3/011 345/163 |
| 2008/0259026 A1 | 10/2008 | Zeldin et al. | |
| 2008/0266271 A1 * | 10/2008 | Van Berkel et al. | 345/174 |
| 2008/0297478 A1 * | 12/2008 | Hotelling | G06F 3/03544 345/163 |
| 2009/0049388 A1 | 2/2009 | Taib et al. | |
| 2009/0095540 A1 | 4/2009 | Zachut et al. | |
| 2009/0139778 A1 * | 6/2009 | Butler et al. | 178/18.03 |
| 2009/0213081 A1 | 8/2009 | Case, Jr. | |
| 2010/0220062 A1 * | 9/2010 | Antila | 345/173 |
| 2010/0234756 A1 * | 9/2010 | Hyoung | H04L 12/12 600/547 |
| 2010/0289744 A1 * | 11/2010 | Cohen | H04L 49/153 345/163 |
| 2011/0109552 A1 * | 5/2011 | Yasutake | G06F 3/03543 345/163 |
| 2011/0199339 A1 * | 8/2011 | Briden et al. | 345/175 |
| 2011/0299512 A1 * | 12/2011 | Fukuda | G06F 1/163 370/338 |
| 2013/0234970 A1 * | 9/2013 | Hodges | G06F 1/1626 345/173 |

OTHER PUBLICATIONS

Balakrishnan, et al., "The Rockin' Mouse: Integral 3D Manipulation on a Plane", Proceedings of the 1997 ACM Conference on Human Factors in Computing Systems (CHI 1997), 1997, pp. 311-318.

Benko, et al., "Precise Selection Techniques for Multi-Touch Screens", CHI 2006, ACM, Apr. 2006, pp. 1263-1272.

Benko, et al., "Sphere: Multi-Touch Interactions on a Spherical Display", UIST 2008, ACM, Oct. 2008, pp. 77-86.

Butler, et al., "SideSight: Multi-"touch" interaction around small devices", UIST 2008, ACM, 2008, pp. 201-204.

Cechanowicz, et al., "Augmenting the Mouse With Pressure Sensitive Input", Proceedings of SIGCHI 2007, ACM, 2007, pp. 1385-1394.

Dannenberg, et al., "A Gesture Based User Interface Prototyping System", retrieved on May 11, 2009 at <<http://www.cs.cmu.edu/afs/cs.cmu.edu/user/rbd/www/papers/Scanned%20Papers/gesture_based_user044.pdf>>, ACM, 1989, pp. 127-132.

Dietz, et al., "DiamondTouch: A Multi-User Touch Technology", Proceedings of UIST 2001, the 14th Annual ACM Symposium on User Interface Software and Technology, Mitsubishi Electric Research Laboratories, Nov. 2001, pp. 219-226.

Engelbart, et al., "A research center for augmenting human intellect", retrieved on Aug. 14, 2009 at <<http://sloan.stanford.edu/MouseSite/1968Demo.html>>, Fall Joint Computer Conference, AFIPS—Conference Proceedings, vol. 33, 1968, pp. 395-410.

Fallman, et al., "The Design of a Computer Mouse Providing Three Degrees of Freedom", Human-Computer Interaction, Part II, HCII 2007, Springer-Verlag Berlin Heidelberg, 2007, pp. 53-62.

"FingerWorks", retrieved on Aug. 14, 2009 at <<http://www.fingerworks.com>>, pp. 1-2.

Forlines, et al., "Direct-Touch vs. Mouse Input for Tabletop Displays", CHI 2007 Proceedings, Mobile Interaction Techniques I, 2007, pp. 647-656.

"Gyration, Go Pro Air Mouse", retrieved on Aug. 14, 2009 at http://www.gyration.com/?l=en#productDetail/office/goProMouse>>, pp. 1-3.

Han, "Low-Cost Multi-Touch Sensing through Frustrated Total Internal Reflection", UIST 2005, ACM, 2005, pp. 115-118.

Hinckley, et al., "The VideoMouse: A Camera-Based Multi-Degree-of-Freedom Input Device", ACM UIST 1999, Symposium on User Interface Software & Technology, CHI Letters 1 (1), pp. 103-112.

Kim, et al., "Inflatable Mouse: Volume-adjustable Mouse with Air-pressure-sensitive Input and Haptic Feedback", CHI 2008 Proceedings—Post-WIMP, ACM, Apr. 2008, pp. 211-224.

Koike, et al., "Integrating Paper and Digital Information on EnhancedDesk: A Method for Realtime Finger Tracking on an Augmented Desk System", retrieved on May 11, 2009 at <<http://www.vogue.is.uec.ac.jp/~koike/papers/tochi/p307-koike.pdf>>, ACM Transactions on Computer-Human Interaction, vol. 8, No. 4, Dec. 2001, pp. 307-322.

"Laptop Users Prefer Mice over Touchpads, Survey", PC Business Products, Sep. 2003, 1 page.

Latulipe, et al., "Bimanual and Unimanual Image Alignment: An Evaluation of Mouse-Based Techniques", UIST 2005, ACM, 2005, pp. 123-131.

(56) References Cited

OTHER PUBLICATIONS

"Linux Finger-Sensing Pad Driver", retrieved on May 11, 2009 at <<http://sourceforge.net/projects/fsp-lnxdrv/>>, SourceForge.net, 2009, pp. 1-3.
MacKenzie, et al., "A Two-Ball Mouse Affords Three Degrees of Freedom", ACM SIGCHI Extended Abstracts 1997, Late-Breaking/Short Talks, pp. 303-304.
Malik, et al., "Interacting with Large Displays from a Distance with Vision-Tracked Multi-Finger Gestural Input", ACM, 2005, 1 page.
Matsushita, et al., "HoloWall: Designing a Finger, Hand, Body, and Object Sensitive Wall", UIST 1997, ACM, 1997, pp. 209-210.
"Microsoft Surface", retrieved on Aug. 14, 2009 at <<http://www.microsoft.com/surface/>>, Microsoft, 2009, pp. 1-3.
"Mighty Mouse", retrieved on Aug. 14, 2009 at <<http://www.apple.com/mightymouse/>>, Apple, pp. 1-3.
"MoGo Mouse BT", retrieved on Aug. 14, 2009 at <<http://www.newtonperipherals.com/mogo_mouseBT.html>>, Newton Peripherals, 2007, pp. 1-3.
"MX Air Rechargeable Cordless Air Mouse", retrieved on Aug. 14, 2009 at <<http://www.logitech.com/index.cfm/mice_pointers/mice/devices/3443&cl=US,EN>>, Logitech, 2009, pp. 1-4.
Rekimoto, "SmartSkin: An Infrastructure for Freehand Manipulation on Interactive Surfaces", CHI 2002, ACM, 2001, pp. 113-120.
Siek, et al., "Fat Finger Worries: How Older and Younger Users Physically Interact with PDAs", Proceedings of Interact 2005, 2005, pp. 267-280.
Siio, et al., "Real-World Interaction using the FieldMouse", Proceedings of ACM UIST 1999, ACM, 1999, pp. 113-119.
"TrackPoint Mouse", retrieved on May 11, 2009 at <<http://www.almaden.ibm.com/cs/user/tp/tpmouse.html>>, User System Ergonomics Research, Almaden Research Center, IBM Corporation, May 10, 2004, pp. 1-2.
Venolia, "Facile 3D Direct Manipulation", Proceedings of ACM SIGCHI 1993, INTERCHI 1993, ACM, Apr. 1993, pp. 31-36 and 547.
Wigdor, et al., "LucidTouch: A See-Through Mobile Device", UIST 2007, ACM, 2007, pp. 269-278.
Wobbrock, et al., "Gestures without Libraries, Toolkits or Training: A $1 Recognizer for User Interface Prototypes", UIST 2007, ACM, 2007, 10 pages.
Zimmerman, et al., "Applying Electric Field Sensing to Human-Computer Interfaces", Proceedings of ACM SIGCHI 1995, ACM, 1995, pp. 280-287.
Borghino, "Mouse 2.0: Microsoft's multi-touch mouse prototypes", retrieved on Oct. 13, 2009 at <<http://www.gizmag.com/microsoft-multi-touch-mouse-prototypes/13081/>>, Gizmag, Personal Computing, Oct. 10, 2009, pp. 1-4.
Casiez, et al., "The DigiHaptic, a New Three Degrees of Freedom Multi-finger Haptic Device", retrieved on May 11, 2009 at <<http://www2.lifl.fr/~casiez/publications/vric03-casiez.pdf>>, 5 pages.
Greene, "A Touch of Ingenuity", MIT Technology Review, Sep./Oct. 2009, pp. 1-4.
Hinckley, et al., "Touch-Sensing Input Devices", retrieved on Oct. 13, 2009 at <<http://delivery.acm.org/10.1145/310000/303045/p223-hinckley.pdf?key1=303045&key2=9404245521&coll=GUIDE&dl=GUIDE&CFID=57466035&CFTOKEN=99875617, CHI 1999, ACM, May 15-20, 1999, pp. 223-230.
Michelitsch, et al., "Multi-Finger Haptic Interaction within the MIAMM Project", retrieved on May 11, 2009 at http://miamm.loria.fr/doc_publique/publications/EuroHapticsAbstract.pdf>>, pp. 1-3.
Moscovich, et al., "Multi-Finger Cursor Techniques", Proceedings of Graphics Interface 2006, Quebec City, Canada, 2006, 7 pages.
"Next step in Apple touch interface—multi-touch mouse", retrieved on Oct. 13, 2009 at http://pcjoint.com/2007/07/05/next-step-in-apple-touch-interface-multi-touch-mouse/>>, PC Joint, Jul. 5, 2007, pp. 1-2.
Pash, "Use Your iPhone as a Multi-Touch Mouse with Touchpad Pro", retrieved on Oct. 13, 2009 at <<http://lifehacker.com/363655/use-your-iphone-as-a-multi+touch-mouse-with-touchpad-pro>>, Lifehacker, Mar. 4, 2008, 1 page.
"8-BIT Microprocessor Unit," Motorola Semiconductors, Freescale Semiconductor, Inc., Published 1982, available at <<http://html.alldatasheet.com/html-pdf/356904/MOTOROLA/MC146805E2/387/1/MC146805E2.html>> 1 page.
Office Action for U.S. Appl. No. 12/485,543, mailed on Jan. 9, 2012, Nicolas Villar, "Pointing Device with Independently Movable Portions," 15 pages.

\* cited by examiner

POINTING DEVICE USING PROXIMITY SENSING

BACKGROUND

Pointing devices are widely used to support human-computer interaction. Current pointing devices allow the user to move an on-screen cursor using movements of their arm and wrist (e.g. in the case of computer mouse devices) or their fingers and thumb (e.g. in the case of touch-pads and trackballs). Most users prefer mouse devices for regular use on a desktop setting. Mouse devices are generally considered to be more comfortable for extended use than other alternatives.

The traditional computer mouse detects two-dimensional motion relative to the surface upon which it is placed, and includes one or more buttons for binary input (known as 'clicking'). Since its inception in the 1960s, the computer mouse has undergone several decades of iterative refinement. For example, mouse devices now offer high fidelity sensing of a user's movement due to high-resolution optical sensors that can be used to track displacement over many types of surface. The basic mouse functionality has also been augmented with additional capabilities, the most successful of which has been the addition of the scroll wheel. Modern mouse devices are ergonomically designed to be held in a single hand and require little effort to use. Such refinements have resulted in the computer mouse becoming a very well-established device for desktop users. Nevertheless, the basic mouse concept and functionality has remained essentially unchanged.

Humans are naturally dexterous and use their fingers and thumbs to perform a variety of complex interactions with everyday objects to a high precision. Certain input movements and gestures are more easily accomplished by using the fine motor control of one or more fingers and thumb, rather than the gross motor control of the arm and wrist. For example, moving an object a fraction of a millimeter, or tracing an accurate path (for example, when drawing or writing) can be more quickly, easily and exactly accomplished by using fingers and thumb rather than with the arm and wrist. The traditional computer mouse design, however, makes little use of this dexterity, reducing our hands to a single cursor on the screen. Our fingers are often relegated to performing relatively simple actions such as clicking the buttons or rolling the scroll wheel.

The embodiments described below are not limited to implementations which solve any or all of the disadvantages of known pointing devices.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A pointing device using proximity sensing is described. In an embodiment, a pointing device comprises a movement sensor and a proximity sensor. The movement sensor generates a first data sequence relating to sensed movement of the pointing device relative to a surface. The proximity sensor generates a second data sequence relating to sensed movement relative to the pointing device of one or more objects in proximity to the pointing device. In embodiments, data from the movement sensor of the pointing device is read and the movement of the pointing device relative to the surface is determined. Data from the proximity sensor is also read, and a sequence of sensor images of one or more objects in proximity to the pointing device are generated. The sensor images are analyzed to determine the movement of the one or more objects relative to the pointing device.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a computer mouse, this is provided as an example and not a limitation. As those skilled in the art will appreciate, the present examples are suitable for application in a variety of different types of pointing devices.

Figure 1:
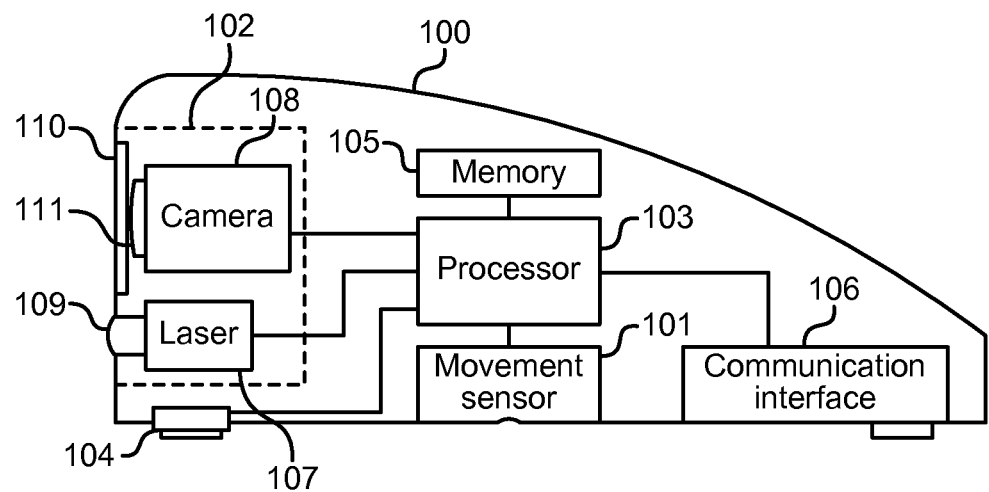
FIG. 1 illustrates a schematic diagram of a pointing device with proximity sensing.

FIG. 1 illustrates a schematic diagram of a pointing device 100 comprising a movement sensor 101 and a proximity sensor 102. The movement sensor 101 and the proximity sensor 102 and are both connected to a processor 103. Also connected to the processor 103 are one or more buttons 104, a memory 105 arranged to store data and instructions for execution on the processor 103, and a communication interface 106 arranged to communicate with a user terminal.

The movement sensor 101 is arranged detect movement of the pointing device 100 relative to a surface over which the pointing device 100 is moved. The movement sensor 101 outputs a data sequence to the processor 103 that relates to the movement of the pointing device 100. The data sequence can be in the form of an x and y displacement in the plane of the surface in a given time. Alternatively, raw data (e.g. in the form of images or a signal having a certain frequency) can be provided to the processor 103, and the processor 103 can determine the x and y displacement from the raw data. Preferably, the movement sensor 101 is an optical sensor, although any suitable sensor for sensing relative motion over a surface can be used (such as ball or wheel-based sensors).

The proximity sensor 102 is arranged to detect the presence of one or more objects in proximity to the pointing device 100. For example, the proximity sensor 102 is arranged to detect one or more digits of a user located around the periphery of the pointing device 100. Note that the term 'digit' is intended herein to encompass both fingers and thumbs. The proximity sensor 102 can also detect other objects such as a stylus, pen brush, a mobile telephone, or another pointing device, as described hereinafter.

The proximity sensor 102 is arranged to provide a data sequence to the processor 103 so that the movement of the one or more objects can be determined and tracked. Note that the determination of the movement of the one or more objects can be performed by the processor 103 on the pointing device 100, or the processor 103 can be arranged to transmit the data sequence to the user terminal via the communication interface, and the determination performed on the user terminal.

FIG. 1 illustrates an example of a camera-based proximity sensor (described below), but any other suitable type of proximity sensor can be used. Alternative types of proximity sensor include optical (photoelectric), acoustic, ultrasonic, electrostatic (capacitive), inductive, thermal imaging or magnetic sensors. An alternative sensor arrangement to that shown in FIG. 1 is described with reference to FIG. 17 hereinafter. Note that while the proximity sensor 102 of FIG. 1 is illustrated as being located at the front of the pointing device 100, the proximity sensor 100 can be located anywhere in the pointing device. In addition, a plurality of proximity sensors can be provided in the pointing device. Such a plurality of proximity sensors can be of the same type or of different types.

As mentioned, the proximity sensor 102 in the example of FIG. 1 is a camera-based proximity sensor. The proximity sensor 102 comprises an illumination source 107 acting as an emitter of electromagnetic radiation and a camera 108 acting as a detector of electromagnetic radiation reflected off objects.

In the example of FIG. 1, the illumination source 107 is a laser, although other illumination sources can also be used, such as LEDs. Preferably, the illumination source 107 emits infrared (IR) light, which is not visible to a user. However, in alternative examples, other wavelengths of radiation can be used, such as visible light or ultraviolet light. In the example of FIG. 1, the laser outputs a beam of IR light through a line generator 109, which forms the beam of light into a sheet of IR illumination which is substantially parallel to the surface, and a small height above it. In alternative examples, the laser can be arranged to scan across the plane of the surface (e.g. by moving the laser or by use of a moving mirror).

The camera 108 is arranged to detect light from the illumination source 107 reflected by objects in proximity to the pointing device 100. Light input to the proximity device can optionally pass through a filter 110, such that light of the wavelength emitted from the illumination source 107 is provided to the camera, and other wavelengths are suppressed. For example, filter 110 can be an IR-pass filter if IR light is emitted from the illumination source 107. The camera 108 can be provided with a lens 111 to give the camera the desired field of view. For example, the lens 111 can be a wide-angle lens or fish-eye lens.

In the case of a camera-based proximity sensor 102, the data provided to the processor is in the form of a sequence of images. These images can show one or objects illuminated by the illumination source 107. These images can be processed to determine the presence and movement of the objects, as described below with reference to FIGS. 2 and 3.

The one or more buttons 104 are arranged to enable the user to enact 'click' events in a similar manner to buttons on conventional computer mouse devices. Whilst the buttons 104 in FIG. 1 are shown on the underside of the pointing device (such that they can be actuated by downwards pressure on the top surface of the pointing device), they can, in other examples, be located elsewhere on the pointing device (such as the top surface) or omitted altogether.

The pointing device 100 illustrated in FIG. 1 has a similar form-factor to conventional computer mouse devices, although can be in any suitable form-factor for a given application.

Figure 2:
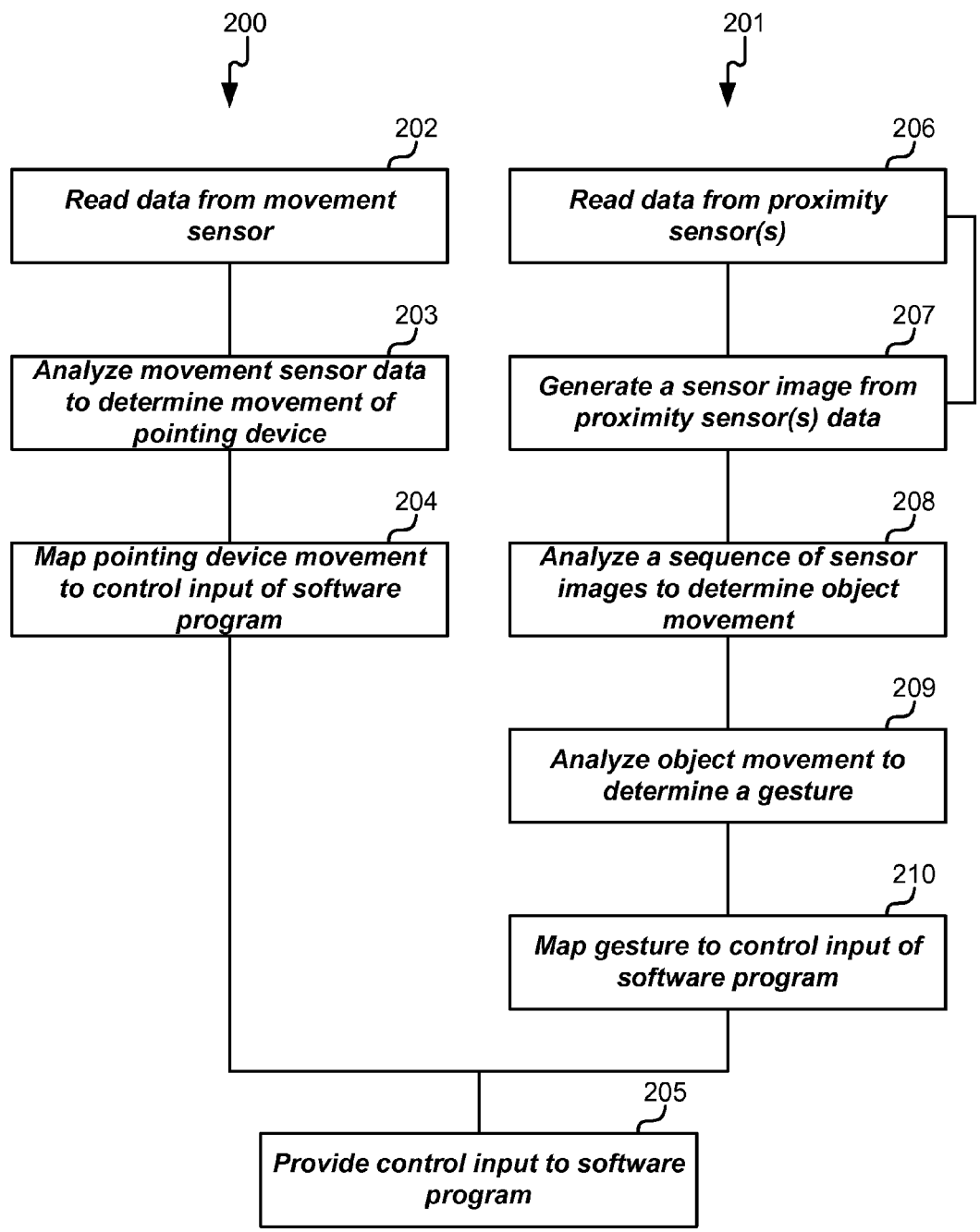
FIG. 2 illustrates a process for processing sensor data from the pointing device with proximity sensing.

Reference is now made to FIG. 2, which illustrates the operation of the pointing device of FIG. 1. FIG. 2 shows the processes performed to process the data from the movement sensor 101 and the proximity sensor 102. Note that the process shown in FIG. 2 can be performed by the processor 103 in the pointing device 100, or, alternatively, the processor 103 can be arranged to transmit the sensor data to the user terminal, and the user terminal can perform the process of FIG. 2. In a further alternative example, the processing of the processes in FIG. 2 can be split between the processor 103 and the user terminal.

FIG. 2 shows two branches which can be processed substantially concurrently. A first branch 200 processes data from the movement sensor 101, and a second branch 201 processes data from the proximity sensor 102. Whilst these two branches can be analyzed in parallel, they can also be alternately performed in a time sequence, such that, from the perspective of the user, they appear to be substantially concurrent.

Considering the first branch 200, firstly the data from the movement sensor 101 is read 202. As mentioned above, the data from the movement sensor 101 is a sequence relating to the movement of the movement sensor 101 over a surface. In the case of an optical movement sensor, this can be in the form of a sequence of small images of the surface captured at known time intervals.

The data from the movement sensor 101 is then analyzed 203. The analysis of the data determines the movement of the pointing device relative to the surface in a given timeframe. For example, in the case of an optical movement sensor, an image of the surface can be compared to a previously obtained image, and a displacement between the images calculated. As the time between capturing the images is known, the motion of the pointing device in that time can be determined.

The movement of the pointing device 101 is then mapped 204 to a control input of a software program. For example, if the movement of pointing device 101 is being mapped to an on-screen cursor, then x and y displacement values for the cursor can be calculated from the determined movement of the pointing device 100.

The control input (e.g. the cursor displacement) is then provided 205 to the software program (e.g. an operating system) such that the movement of the pointing device 100 relative to the surface can be used in the software program (e.g. to move a cursor in a user interface).

Reference is now made to the second branch 201. Firstly the data from the proximity sensor 102 is read 206. As mentioned above, the data from the proximity sensor 101 relates to the presence of one or more objects in proximity to the pointing device 100. In the case of the camera-based proximity sensor of FIG. 1, the data is in the form of an image, captured by the camera 108, containing one or more objects illuminated by the illumination source 107.

The data from the proximity sensor 102 is then processed to generate 207 a sensor image in which objects of interest are located. The manner in which the sensor image is generated depends upon the type of proximity sensor used. For the case of a camera-based proximity sensor, this is outlined in more detail with reference to FIG. 3, described hereinafter. The sensor image generated can comprise an image indicating the location of the one or more objects relative to the pointing device 100. For example, the sensor image can be a depth map indicating the position of an object relative to the proximity sensor (e.g. as an x-coordinate in the field of view of the proximity sensor, or an angular displacement relative to the proximity sensor), and the depth of the object in terms of its distance from the proximity sensor.

The reading of data and generation of sensor images can be repeated one or more times in order to produce a sequence of sensor images. The sequence of sensor images are then analyzed 208 to determine the movement of one or more objects in the sensor images. The sensor images are compared, such that the movement of the one or more objects over time in subsequent sensor images is tracked. Note that the movement of the one or more objects is relative to the pointing device 100. This is to be contrasted with the movement detected by the movement sensor 101, which is relative to the surface on which the pointing device 100 is operated.

The tracked movement of the one or more objects is analyzed 209 to determine whether the movement corresponds to a gesture. The term 'gestures' is used herein to refer to movement by a user or caused by a user (e.g. where motion of an object moved by a user is detected). The gesture can be pre-defined (e.g. a user moving a certain manner can have a particular meaning) or can be any other movement. Example gestures are discussed in more detail below with reference to FIG. 4 to 12.

If a gesture is detected, then this is mapped 210 to a control input to a software program. For example, the gesture can be mapped to the movement of an on-screen cursor, in which case x and y displacement values for the cursor can be calculated from object movement. Alternatively, the gesture can be mapped to the manipulation of an on-screen object, in which case the manipulation parameters are calculated. In a further alternative, if the gesture is mapped to the execution of a software program, the actuation of a function or a selection from a menu, then an appropriate command is created.

In another example, the detected gesture can be the presence of one or more digits of the user's hand tapping the surface. Such 'tapping' gestures can be mapped to 'click' events similar to those generated by the buttons 104. These gestures can be used instead of or in addition to the hardware buttons 104. Depending on where the gesture is detected in relation to the pointing device, the gesture can be interpreted as a 'right-click' or 'left-click' command, as used in traditional computer mouse devices with left and right buttons.

Then, as above, the control input derived from the gesture is provided 205 to the software program such that the gesture can be used in the software program. The control input derived from the gesture can control either the operating system or an application executed on the operating system.

Figure 3:
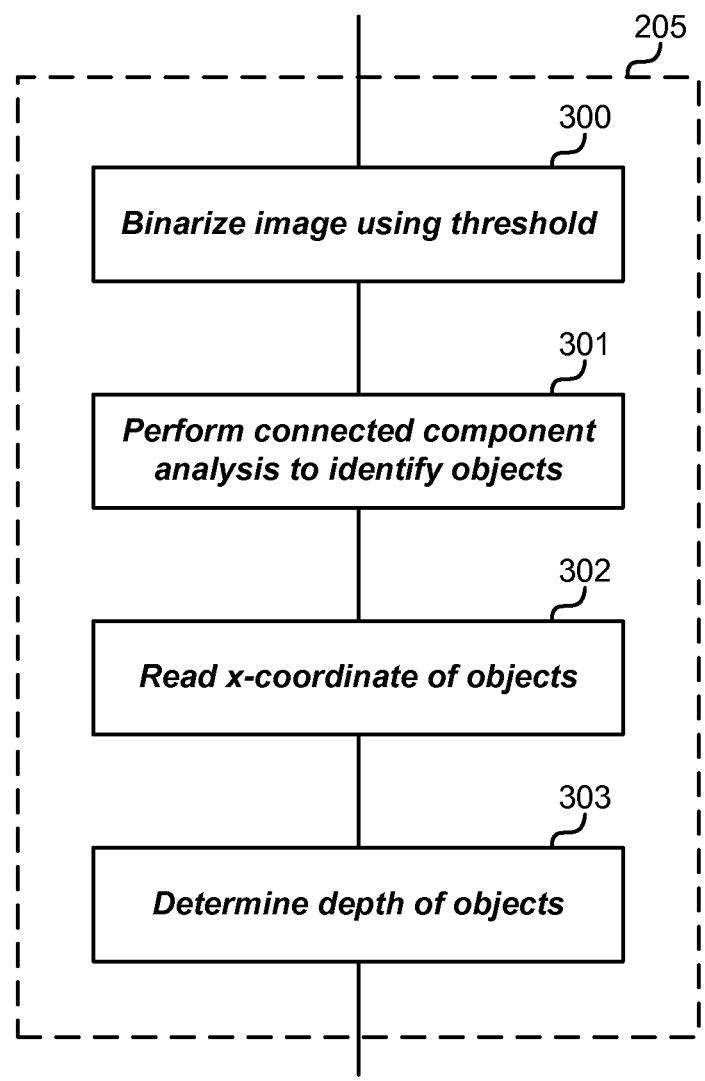
FIG. 3 illustrates a process for generating a sensor image from a proximity sensor.

Reference is now made to FIG. 3, which illustrates in more detail a process for generating sensor images (205 in FIG. 2) in the case of a camera-based proximity sensor, such as that shown in FIG. 1. The camera 108 outputs an raw unprocessed image which comprises background objects which are sufficiently far away from the pointing device 100 not to be illuminated by the illumination source 107, and one or more foreground objects which are close enough to be illuminated by the illumination source 107. Therefore, the background objects are darker than the foreground objects.

Firstly, the raw camera image is converted to a black and white image in a process called 'binarizing' 300. The pixel value for each pixel in the raw image is compared to a predefined threshold, such that if the pixel value is less than or equal to the predefined threshold the pixel is set as a black pixel, and if the pixel is greater than the predefined threshold the pixel is set as a white pixel. The result of binarizing the image is that the background objects are removed and only the foreground objects remain as white regions.

A connected component analysis is then performed 301 on the binarized image. The connected component analysis identifies and labels each distinct foreground object by analyzing the white regions of the binarized image.

The location of each of the identified foreground objects relative to the pointing device 100 is determined 302. This can be achieved by determining the centre of each identified foreground object, and using the position of this point in the image as the x-coordinate of the object relative to the proximity sensor. The x-coordinate in this case refers to the displacement of the object on an axis substantially perpendicular to the center of the field of view of the proximity sensor 102. Note that the location can also take into account the lens 111 of the camera 108, such that the location is transformed to counteract pre-known lens distortion. In alternative examples, the location can be interpreted as an angular displacement from a reference point (e.g. the camera bore-sight), which can be useful in the case of very wide angle lenses. Optionally, the y-coordinate of the object in the image (i.e. the height above the surface relative to the pointing device 100) can also be similarly determined.

The depth of the foreground objects (i.e. the distance between the object and the proximity sensor 102) is also determined 303. This can be performed in several ways. For example, if a 3D time-of-flight camera or stereo camera is used, then this information is directly available in the image. If the camera is a regular video camera, then the original raw image can be used to estimate the depth. This can be performed by using the center point of a foreground object from the binarized image (as found above) and then analyzing the corresponding point in the raw image. The average pixel value can be found from a set of pixels surrounding the center point in the raw image, and the average pixel value used to estimate the depth. For example, a foreground object with a low average pixel value is darker (i.e. less illuminated) and therefore relatively far from the illumination source 107. Conversely, a foreground object with a high average pixel value is brighter (i.e. more illuminated) and therefore close to the illumination source 107.

In an alternative example, the depth of the foreground objects can be calculated by using an angled sheet of illumination from the illumination source 107. If the illumination source 107 produces a sheet of illumination which is angled relative to the camera 108, then the height of an illuminated foreground object in the camera image is related to the distance from the illumination source 107. For example, if the sheet of illumination is angled downwards from the pointing device 100 towards the surface, then objects closer to the pointing device 100 intercept the sheet at a greater height from the surface than those further away from the pointing device 100. Therefore, objects that are closer to the pointing device are seen as higher in the image captured by the proximity sensor, and the depth can be related to this height. In other examples, the sheet of illumination can be angled upwards relative to the surface, in which case objects that are close to the pointing device appear low in the image captured by the proximity sensor relative to objects that are further away.

Once the process in FIG. 3 has been performed a sensor image has been formed which identifies each foreground object from the sensor data, and records a location and depth for each object. This can therefore be used as described above with reference to FIG. 2 to track the movement of objects and identify gestures. Note that the location and depth of the object relative to the pointing device can be mapped into a different coordinate system for display on a user terminal.

Figure 4:
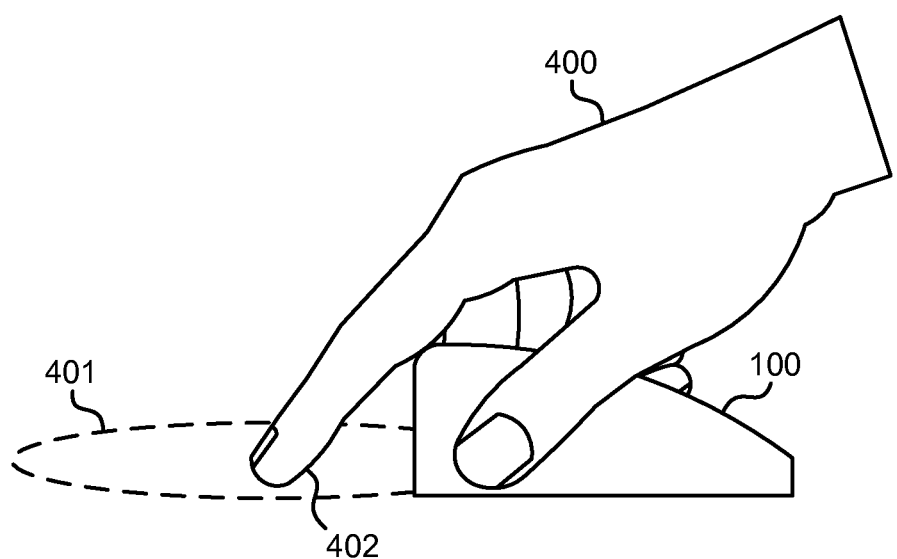
FIG. 4 illustrates the operation of the pointing device with a single object in proximity.
Figure 5:
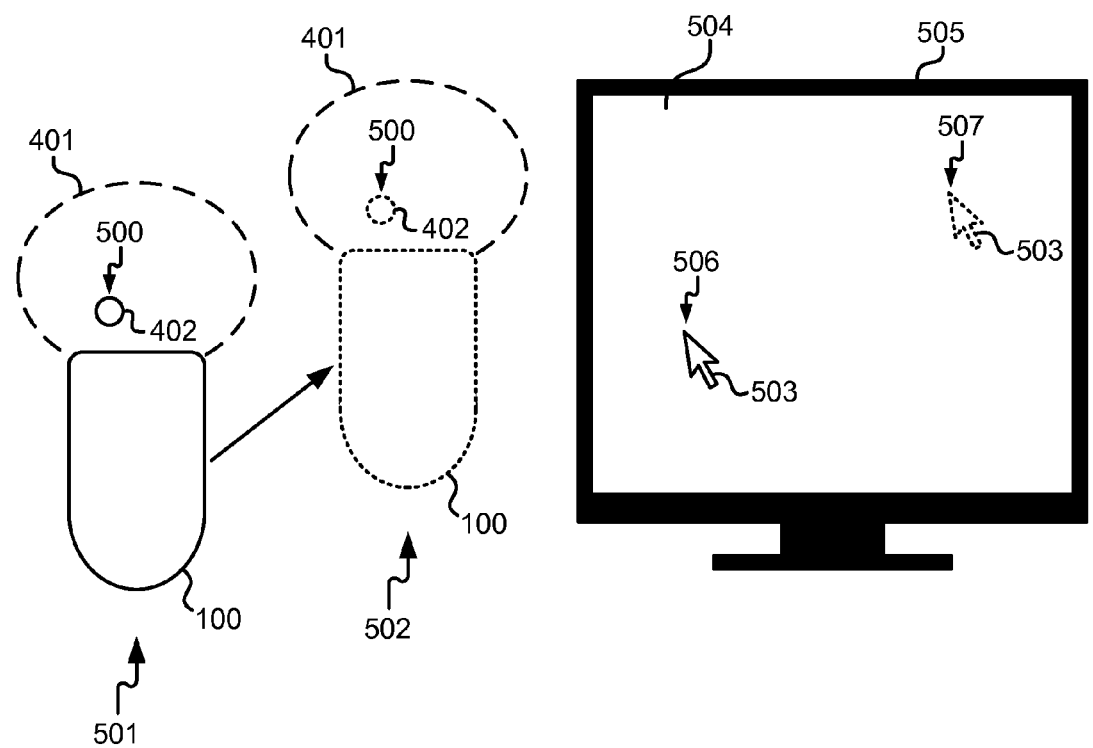
FIG. 5 illustrates control of a cursor using movement of the pointing device.
Figure 6:
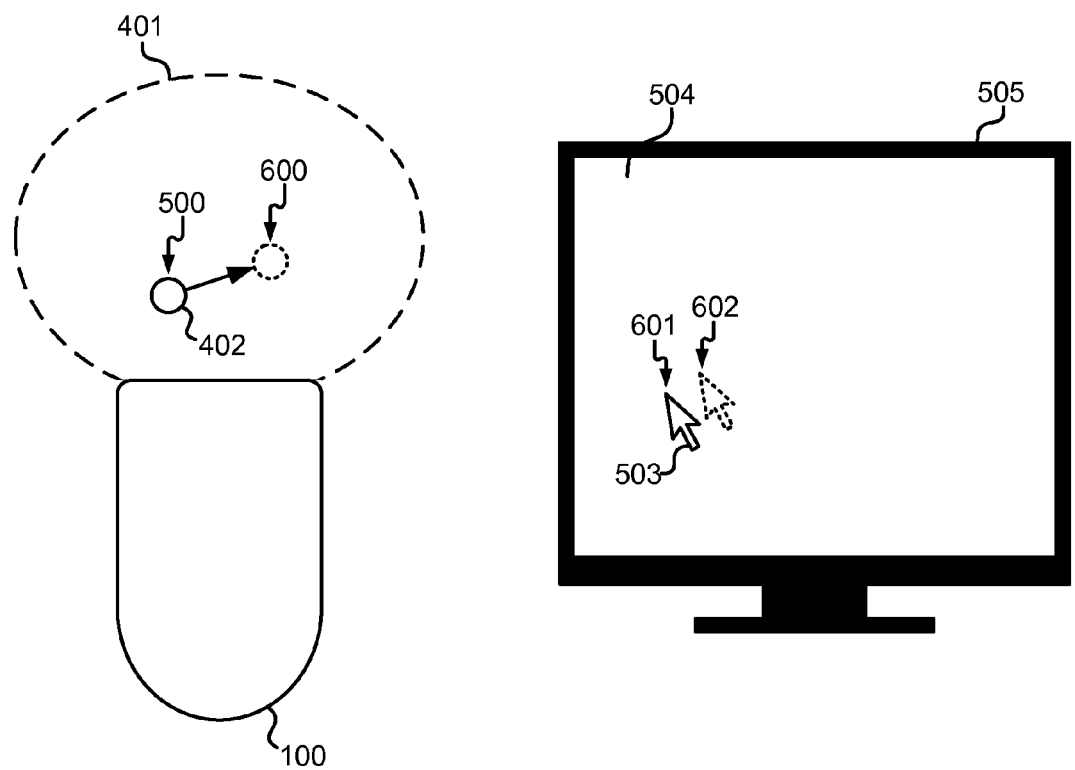
FIG. 6 illustrates control of a cursor using movement of an object in proximity to the pointing device.

Reference is now made to FIGS. 4, 5 and 6, which illustrate the operation of the above-described pointing device in the case of single objects in proximity. FIG. 4 shows the pointing device 100 being held in a hand 400 of a user (in a similar manner to a computer mouse). An interaction zone 401 is shown in front of the pointing device, which illustrates the field of view of the proximity sensor (i.e. the range over which the proximity sensor 102 can detect an object). In the illustration in FIG. 4, the user has a digit 402 in the interaction zone 401 (e.g. the digit 402 is illuminated and can be detected by the camera 108 as described above).

FIG. 5 shows a top-down view of the scene in FIG. 4, and illustrates how the pointing device can be used to manipulate an on-screen cursor. In FIG. 5, the user's digit 402 has been detected in the interaction zone 401 at a position 500. The pointing device 100 is initially located at a first position 501, and the user then moves the pointing device 100 over the surface to a second position 502. This movement is detected by the movement sensor 101, and causes a cursor 503 shown in a user interface 504 on a display 505 of the user terminal to move from a first position 506 to a second position 507 (branch 200 of FIG. 2). Note that in the example of FIG. 5, the position 500 of the user's digit 402 remains substantially constant relative to the pointing device 100, despite the overall pointing device 100 moving. Therefore, the behavior of the pointing device 100 in FIG. 5 is similar to that of a traditional computer mouse.

FIG. 6 shows another top-down view of the scene in FIG. 4, and illustrates an alternative way for the pointing device to manipulate an on-screen cursor. In the example of FIG. 6, the pointing device 100 remains in a substantially constant position, and the user's digit 402 moves from a first position 500 to a second position 600. This is detected by the proximity device 102 and processed by branch 201 in FIG. 2. In this example, the gesture of a single object moving in this way is used to control the movement of the cursor 503 on the display 505, such that the cursor 503 moves in a corresponding way to the user's digit 402. In FIG. 6, the cursor 503 moves from a first position 601 to a second position 602. However, in this example, the extent of the movement of the cursor 503 is relatively small compared to that in FIG. 5. This is because the processing of the proximity sensor data is arranged to enable the user to perform fine control over the cursor using their fingers or thumb (which are very dexterous and able to control fine movements), whereas the user can perform coarse but fast pointing gestures using their arm and wrist to move the overall pointing device 100 (as in FIG. 5). This provides the user with the flexibility to move the cursor rapidly around the display 505 when desired, or move it very carefully when desired.

Figure 7:
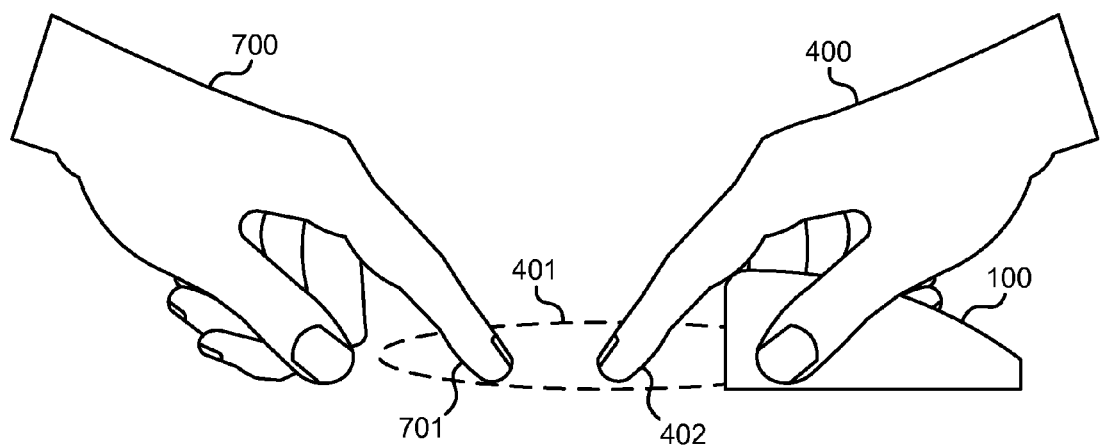
FIG. 7 illustrates the operation of the pointing device with more than one object in proximity.
Figure 8:
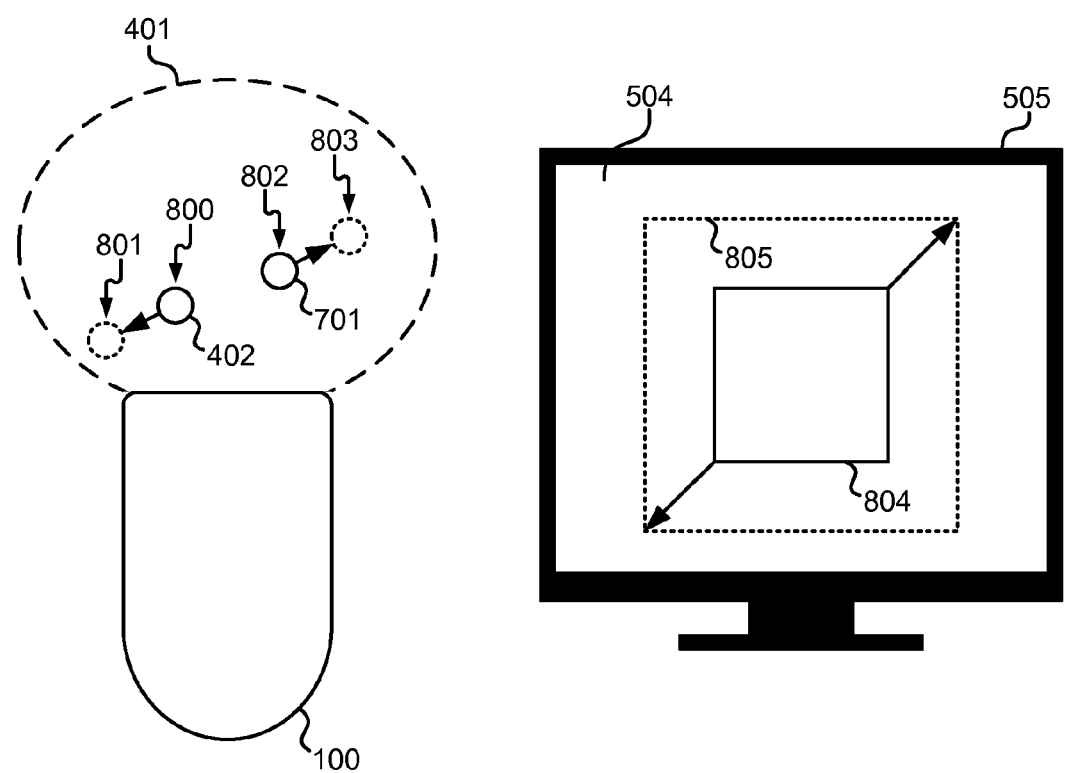
FIG. 8 illustrates control of an on-screen object's size using a gesture.
Figure 9:
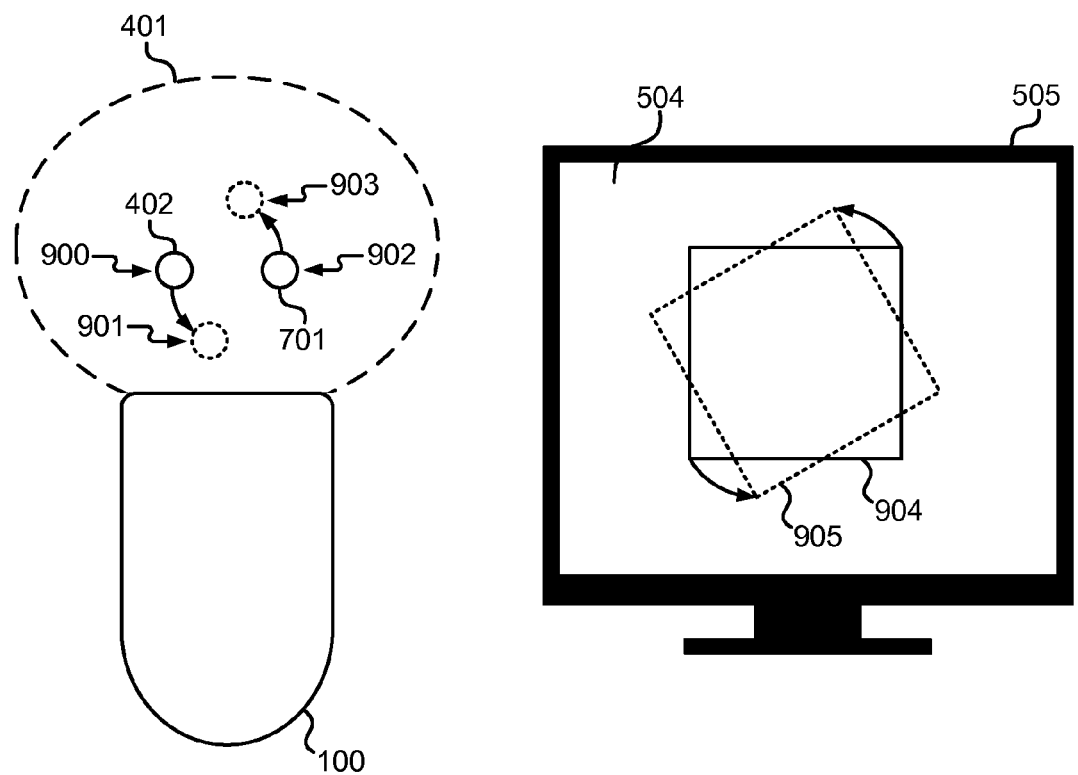
FIG. 9 illustrates control of an on-screen object's orientation using a gesture.

Reference is now made to FIGS. 7, 8 and 9, which illustrate the operation of the above-described pointing device in the case of multiple objects in proximity. The ability of the proximity sensor 102 to detect more than one object in the interaction zone 401 enables the use of 'multi-touch' gestures. The multiple objects can comprise, for example, a plurality of digits of the same hand of the user, digits from different hands of the user, and a combination of digits and other user-manipulated objects.

FIG. 7 shows the user holding the pointing device 100 in their hand 400, and placing a digit 402 in the interaction zone 401. In addition, a second hand 700 is also present, which has also placed a digit 701 in the interaction zone 401. The second hand 700 can be the other hand of the user, or the hand of a further user. Alternatively, the user can place a further digit of hand 400 into the interaction zone 401 in addition to digit 402 (not shown in FIG. 7).

FIG. 8 shows a top-down view of the scene in FIG. 7, and illustrates how the pointing device can be used to manipulate an on-screen object. In the example of FIG. 8, the pointing device 100 remains in a substantially constant position, and digit 402 and digit 701 are moved apart from each other. Finger 402 is moved from a first position 800 to a second position 801, and digit 701 is moved from a first position 802 to a second position 803. The movement of two objects in the interaction zone moving apart from each other (or towards each other) can be interpreted as a gesture to re-size an on-screen object. For example, an object (e.g. a picture) is shown being resized from a first size 804 to a second size 805 on the display 505 responsive to the detected gesture.

FIG. 9 shows another top-down view of the scene in FIG. 7, and illustrates another way in which the pointing device can be used to manipulate an on-screen object. In FIG. 9, the pointing device 100 again remains in a substantially constant position, and digit 402 and digit 701 rotate relative to each other. Finger 402 is moved from a first position 900 to a second position 901, and digit 701 is moved from a first position 902 to a second position 903. The relative rotation of two digits in the interaction zone can be interpreted as a gesture to rotate an on-screen object in the direction in which the digits are rotated. For example, an object (e.g. a picture) is shown being rotated from a first orientation 904 to a second orientation 905 on the display 505 responsive to the detected gesture.

Note that any suitable multi-touch gesture can be detected by the pointing device 100, in addition to the two discussed with reference to FIGS. 8 and 9. For example, only one of the objects can move relative to the other in the interaction zone 401, in order to achieve the same effects as shown in FIGS. 8 and 9. Note also that the multi-touch gestures described above can be combined with movement of the pointing device as shown in FIG. 5 to provide cursor control at substantially the same time.

Figure 10:
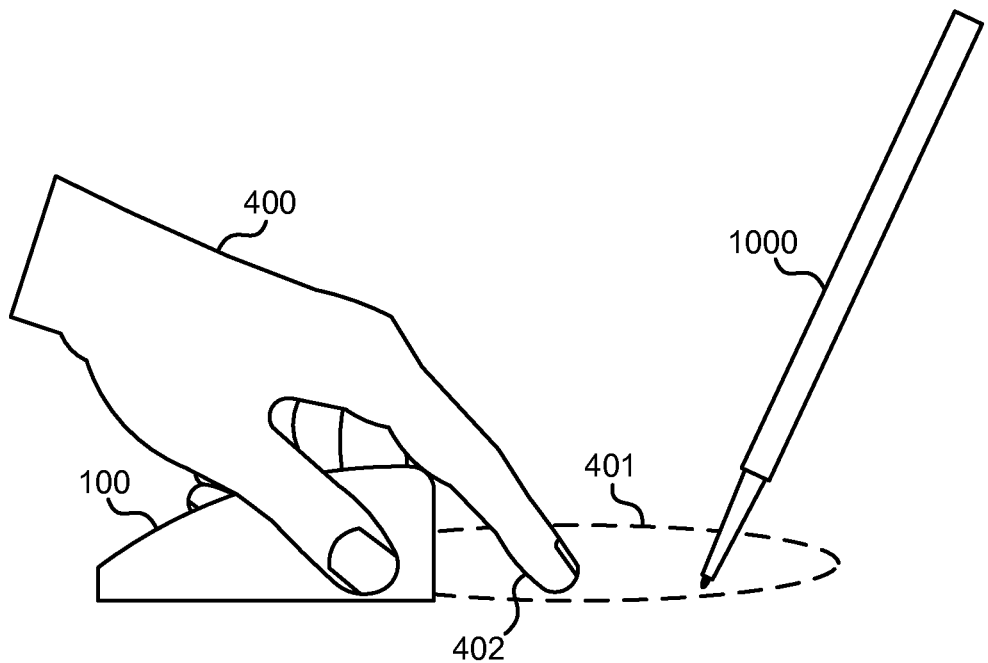
FIG. 10 illustrates multi-modal proximity input to the pointing device.

The gesture based interaction described above can also be combined with other modes of interaction to provide multi-modal interactions. For example, as well as sensing a user's digits in proximity with the pointing device, the proximity sensing can also sense other tangible objects such as pens, styli, brushes or any suitably identifiable object which could be used for non-contact proximity based user input. Further examples include game pieces, tangible manipulation tokens, or rotary knobs for which the relative position to the pointing device, or orientation of the knob can be sensed using the proximity sensor. In a further example, the pointing device can sense that a further pointing device is in proximity, and automatically switch to a bi-manual input mode. In addition, pointing device can be arranged to sense the proximity of a device having IR communication capabilities, such as a mobile telephone having an IRDA port, and communicate with the device using IR communication. In such cases, the proximity device 100 can act as an interface or 'dock' for the device, An example of this is illustrated in FIG. 10, where the user is manipulating the pointing device 100 in a similar manner to that described hereinabove, and, in addition, input is being provided from a stylus 1000 in the interaction zone 401. The stylus 1000 location in the interaction zone can be tracked (as described above) and this can be used to provide handwriting or drawing input to the user terminal. Tangible objects such as pens, styli and brushes can be identified using, for example, computer vision techniques, optical tagging (e.g. barcodes), or RFID tags, such that input from such objects can be interpreted appropriately.

Identifiable objects or codes can be used to control the launch of specific software applications or functions. For example, the identification of a pen object (e.g. due to a tag on the pen) can cause the user terminal to execute a handwriting input application. In another example, the user can generate identifiable codes (such as barcodes) and configure the user terminal to execute specific applications responsive to the pointing device identifying these codes. For example, the user can produce stickers that comprise such codes, and adhere these to a location close to the pointing device. The codes can be assigned to a specific application (such as a web browser or word processor), and the user can cause the user terminal to execute the specific application by pointing the proximity sensor of the pointing device at the appropriate sticker.

Figure 11:
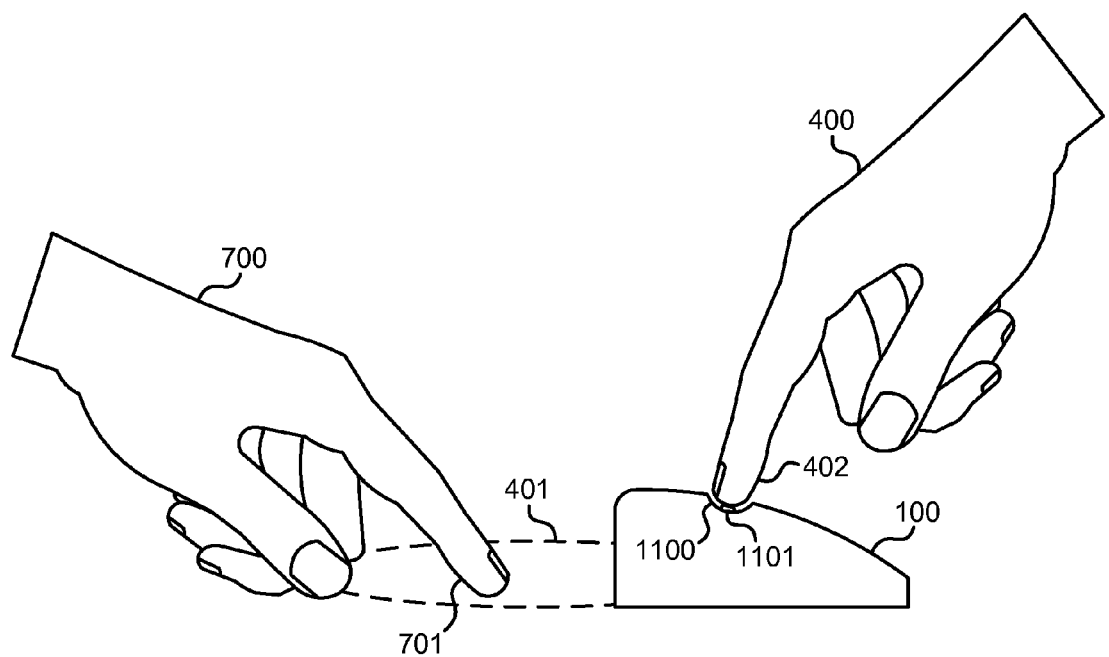
FIG. 11 illustrates gesture input with user-actuated proximity sensing.

Reference is now made to FIG. 11, which illustrates an alternative technique for operating the pointing device 100. A pointing device of the type described above can have the proximity sensors activated during general use or, alternatively, an actuation switch can be provided to activate or de-activate proximity sensing modes. Such an actuation switch can be in the form of a contact point on the pointing device surface, a button or other manual input mechanism. Such an actuation switch can simplify use of the pointing device when proximity enhanced operation is not desired, by avoiding accidental gesture inputs.

In the example of FIG. 11, a recess 1100 is provided on the top surface of the pointing device 100, and within the recess is an actuation switch 1101 arranged to activate the proximity sensing. As the actuation switch 1101 is recessed, it is not actuated during normal mouse-like use of the pointing device 100. However, once the pointing device 100 has been released onto the surface the hand 400 can be lifted and digit 402 inserted down into the recess 1100. This can activate proximity sensing and provide the equivalent of the multi-touch input described above, where digit 402 moves the main body of the pointing device 100 around (with the digit 402 in the recess 1100) whilst digit 701 performs gestures relative to the body of the pointing device 100. Therefore, in this example, the movement detected by the movement sensor 101 (due to the pointing device 100 moving) is combined with the movement detected by the proximity sensor 102 (due to movement by digit 701) to provide input to a software program in the form of multi-touch gestures.

Figure 12:
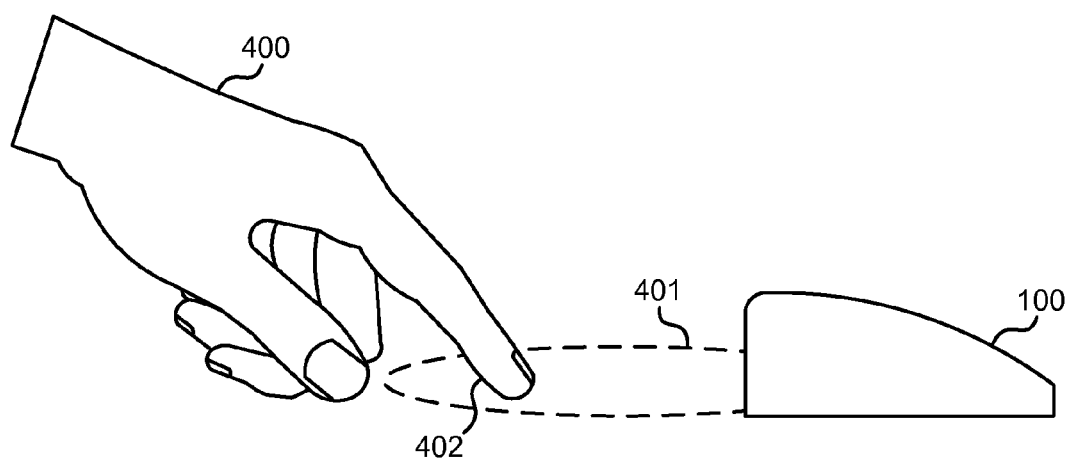
FIG. 12 illustrates gesture input with a stationary pointing device.

A further alternative technique for operating the pointing device 100 is shown illustrated in FIG. 12. In the example of FIG. 12, the pointing device 100 has been released by the hand 400, such that the pointing device 100 is 'parked' (i.e. moved to a location and subsequently released by the user). However, the user has oriented the pointing device 100 such that the proximity sensor 102 is pointed towards the user, so that single or double handed gestures can be performed in the interaction zone 401, without any contact with the pointing device 100 itself.

The pointing device 100 can be arranged to automatically detect that it has been 'parked', so that the proximity sensor 102 can be activated in such a state. For example, the pointing device 100 can comprise a digital compass, which detects when the device is turned though 180°, as can occur if the pointing device is reversed to point the proximity sensor 102 towards the user. In an alternative example, the pointing device 100 can be placed into a 'parked' mode by the selection of a button on the pointing device 100 (not shown in FIG. 1) or using a software control.

In the above-described techniques, the proximity sensor 102 detects one or more objects in proximity to the pointing device 100. However, if a detected object is not an object that is intentionally being manipulated by the user, then erroneous gestures can be interpreted. For example, a user can have several objects in proximity to the pointing device 100, such as a keyboard, telephone or books. Preferably, the pointing device 100 therefore rejects these objects from the proximity sensing. This can be achieved using a number of methods.

Firstly, if only the digits of a user's hand operating the pointing device 100 are being tracked, then the location of these can be determined due to the fact that these digits do not substantially move relative to the pointing device when the pointing device itself is moving. Background objects do, however, move in the sensor images in these circumstances. Therefore, detected objects can be classified as being a digit in such cases, and other objects omitted from the proximity sensing analysis. In this case, other tangible objects that the user wishes to be sensed such as pens, styli and brushes can be identified using, for example optical tagging, RFID or computer vision, as described earlier.

Secondly, in the case where one hand of a user is resting on (or is otherwise in contact with) the pointing device, the pointing device can electrically couple to the body of the user and transmit a known signal into the body which enables the identification and/or rejection of body and non-body parts placed in the proximity of the pointing device. For example, the pointing device can be provided with conductive areas which allow electronic signals to be coupled into the user's skin and body. In this case, an electrostatic or electric field proximity sensor can be used, which is arranged such that other users or objects are rejected (i.e. not sensed) because they are not emitting the signal coupled into the hand holding the pointing device.

Such coupled body signals can also be used to identify individual users holding a specific pointing device, for example when interacting with a shared terminal. Furthermore, noise rejection and sensing distance can be enhanced if the object being sensed has an identifiable and known signal signature and/or phase. In addition, the use of coupled signals transmitted through the body can enable passive tangible objects (pens, styli, etc.) to be ignored until touched by the user either by the hand holding the mouse or by the hand not holding the mouse, thereby enabling such objects to be selected by skin touch and otherwise ignored when not touched.

Thirdly, computer vision techniques can be used to analyze the sensed objects in proximity to the pointing device, and determine whether these are objects connected to user gestures or not. For example, the shape of a detected object can be analyzed to determine whether it fits with known useful shapes, such as digits, pens, etc. To further improve the accuracy of shape detection, the pointing device 100 can be arranged to emit a structured light pattern, which illuminates the objects such that their shape can be more easily discerned and analyzed. An example of such a structured light pattern is a grid or checkerboard pattern. In this way, the pointing device 100 acts as a 3D scanner to detect and analyze objects. Alternatively, a color camera can be used in the proximity sensor and used to determine whether an object matches a skin tone and/or reflectivity, thereby indicating the presence of a digit.

Figure 13:
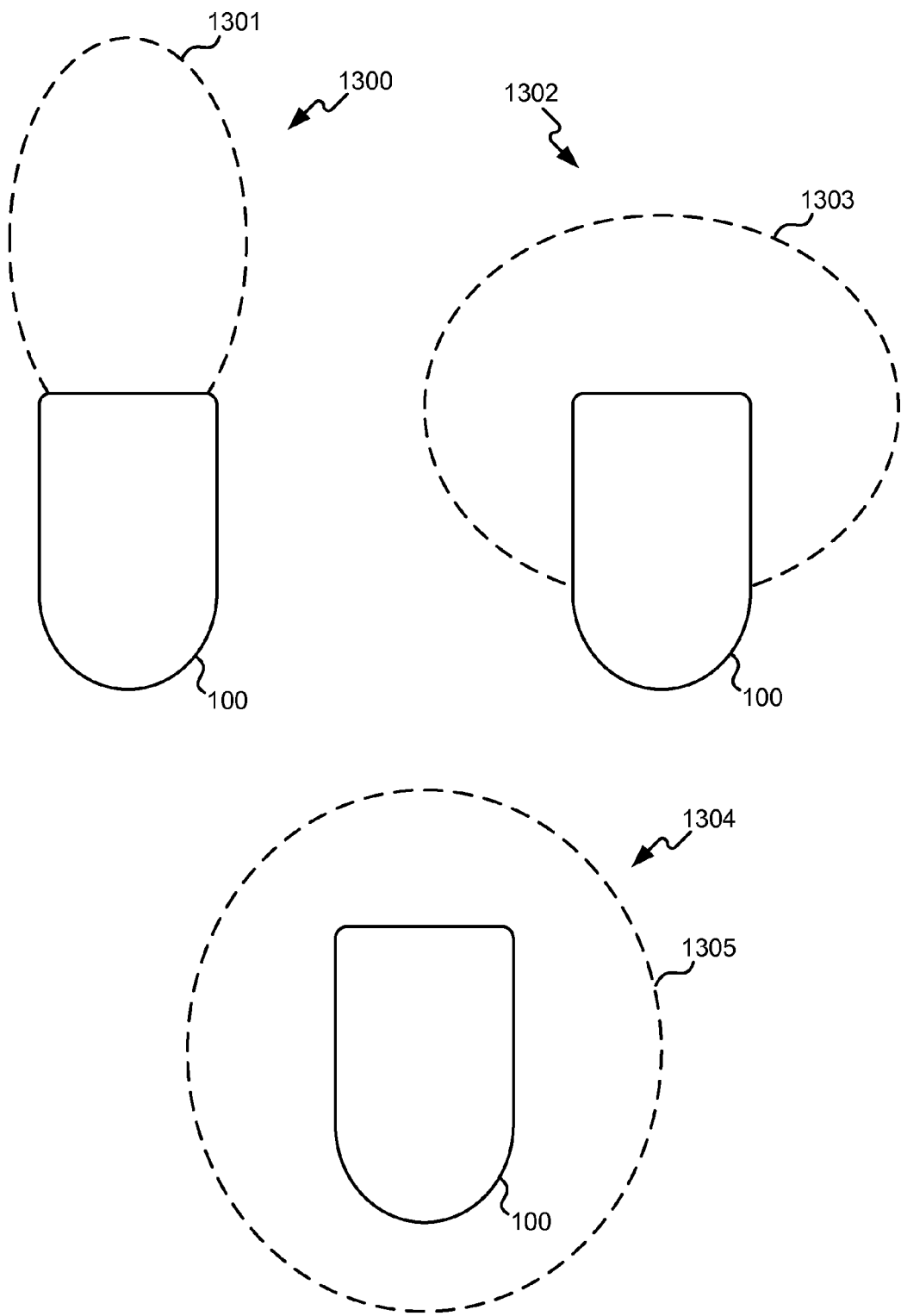
FIG. 13 illustrates examples of proximity interaction zones.

The above-described examples of the pointing device 100 comprised a forward-facing interaction zone. However, any orientation of interaction zone can be used. For example, FIG. 13 illustrates three examples of different orientations. The first example 1300 illustrates a narrow, long interaction zone 1301. The second example 1302 illustrates a wide interaction zone 1303 that covers the sides of the pointing device 100. Such an interaction zone 1303 can be used to detect the user's thumb at the side of the pointing device 100. The third example 1304 illustrates an omni-directional interaction zone 1305, which enables gestural input from the entire periphery of the pointing device 100.

Figure 14:
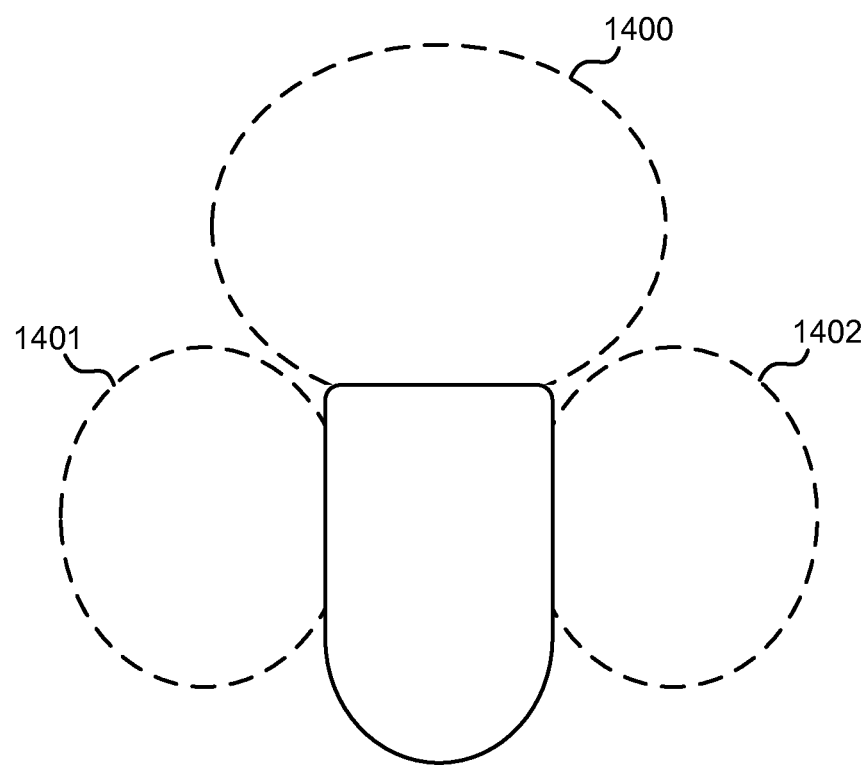
FIG. 14 illustrates an example of a plurality of interaction zones.

In addition, the previously described examples of the pointing device 100 comprised only a single interaction zone. However, any number of interaction zones can be provided, for example by including a plurality of proximity sensors or by coupling several regions of the periphery of the pointing device 100 to a single proximity sensor (e.g. by using waveguides). For example, FIG. 14 illustrates an example of a pointing device having three interaction zones. A first interaction zone 1400 is provided at the front of the pointing device (similar to that described previously) which can, for example, detect a user's fingers. A second interaction zone 1401 and third interaction zone 1402 are provided at the sides of the pointing device, which can, for example, detect a user's thumb.

In another example, an interaction zone can be provided below the pointing device (e.g. using a proximity sensor on the underside of the pointing device). This enables the pointing device to lifted off the surface, and the underside proximity sensor can be used to estimate the height of the pointing device from the surface, which can be used as a control input to the user terminal. A plurality of proximity sensors can be positioned on the underside of the pointing device 100 to provide tilt information, in addition to height information. Alternatively, the pointing device can be lifted off the surface and/or placed in a holder such that the underside proximity sensor looks down on the surface, enabling a wide field of view and accurate determination of x and y coordinates of objects on the surface.

Figure 15:
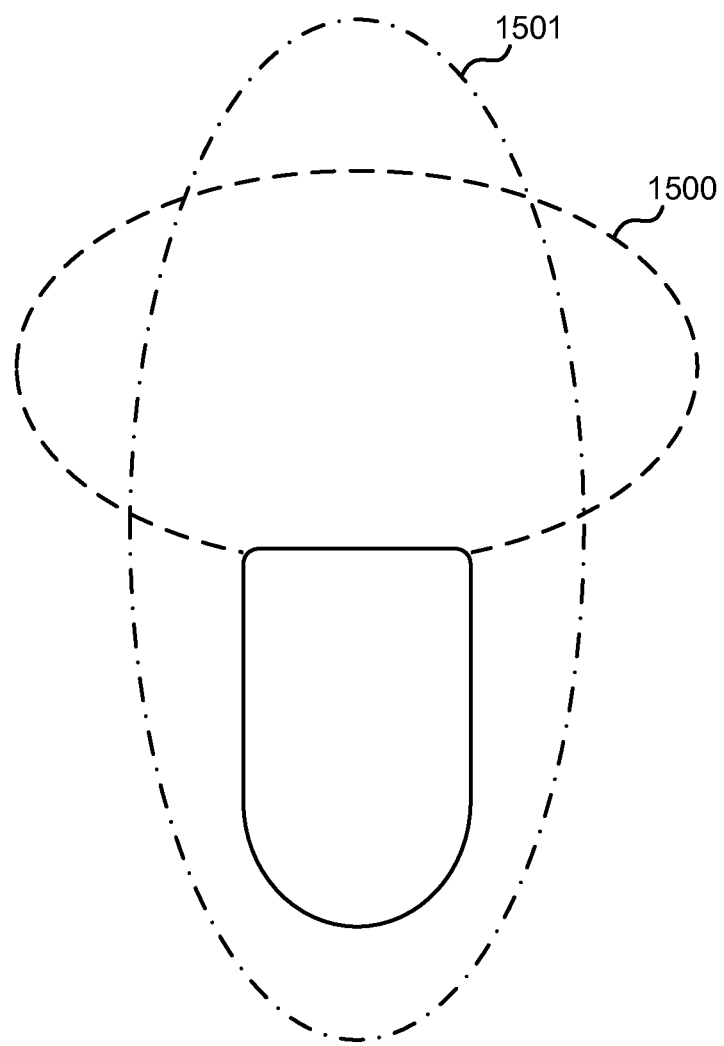
FIG. 15 illustrates an example of multi-mode proximity sensing interaction zones.

A further example is illustrated in FIG. 15, in which two overlapping interaction zones are provided. The two overlapping interaction zones can utilize different proximity sensing technologies. In one example, a forward-facing first interaction zone 1500 can use camera-based proximity sensing to detect a user's digits, and a second interaction zone 1501 can use inductive sensing for pen-based input.

Figure 16:
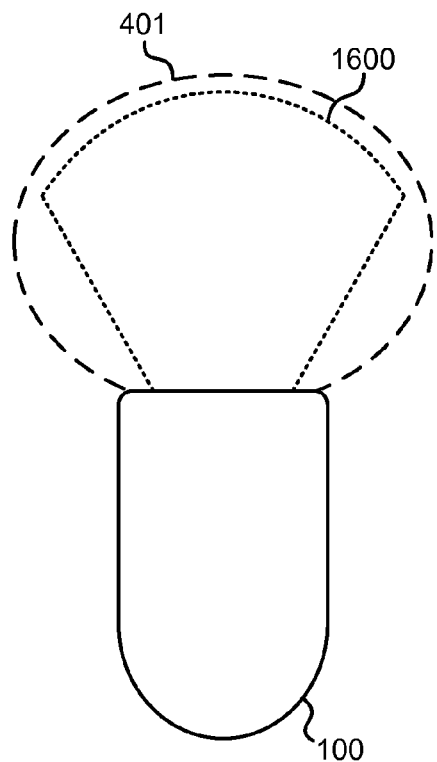
FIG. 16 illustrates a pointing device with a projected interaction zone indicator.
Figure 16:
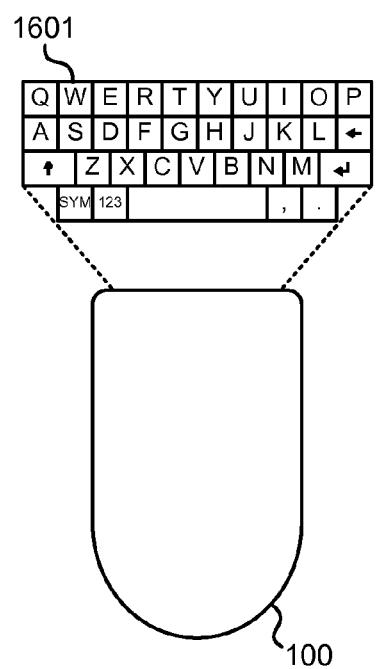

In order to provide increased visual feedback to the user of the pointing device 100, the pointing device 100 can be optionally provided with a projection device for projecting an image onto the surface in the interaction zone. For example, as shown in FIG. 16, the projection device can project a boundary indicator 1600 to show the user the size of the interaction zone, thereby assisting the user in entering gestures in the correct area. In other examples, the projection device can be arranged to project buttons or controls onto the surface (such as keyboard 1601) with which the user can interact. The position of the user's digits is tracked by the proximity sensor 102 and correlated to the projected buttons or controls in order to determine which control a user is actuating. The projection device can be in the form of a laser or LED projector.

Figure 17:
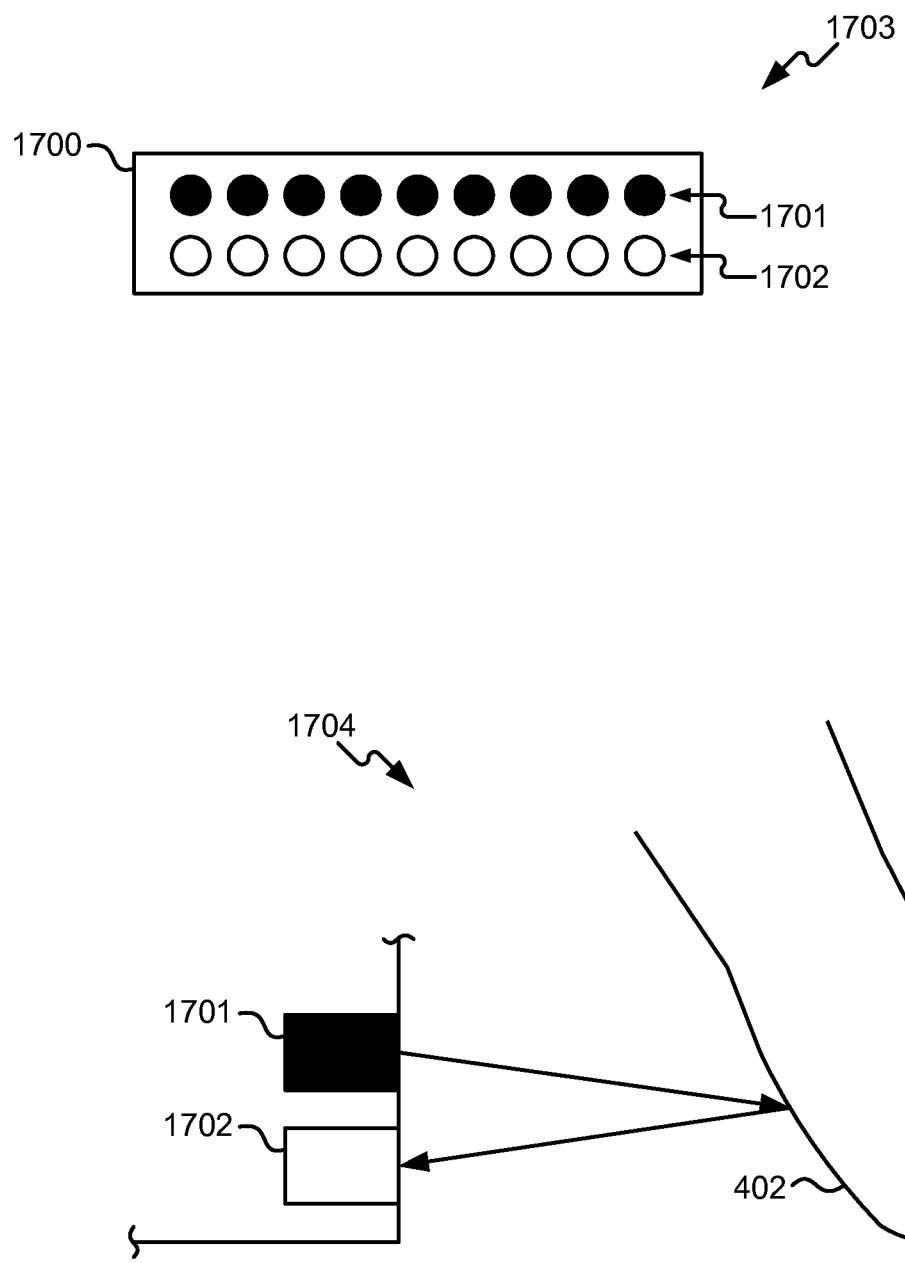
FIG. 17 illustrates an alternative proximity sensor arrangement.

Reference is now made to FIG. 17, which shows a schematic diagram of an alternative proximity sensor arrangement to that illustrated in FIG. 1. The proximity sensor 1700 comprises a plurality of emitters 1701 and a plurality of detectors 1702, as shown in front view 1703. The operation of the sensor is shown in the side view 1704. The emitters 1701 emit electromagnetic radiation of a particular wavelength (or range of wavelengths) and the each detector 1702 detects any radiation which is reflected back by an object (e.g. digit 402).

The particular detector (or detectors) in the plurality of detectors 1702 that detects reflected radiation provides information on the x-axis location of the object. The intensity of the reflected radiation can be detected and this intensity varies depending upon the distance between the proximity sensor 1700 and the reflecting object. Therefore, a depth map can be generated, as described above with reference to FIG. 3. In an example, the emitters 1701 can be IR emitters and the detector can be able to detect IR radiation of the emitted wavelength. Other wavelengths can alternatively be used, such as visible wavelengths or ultra-violet radiation.

The emitter 1701 can for example be an IR LED, OLED, laser or other IR source. Although FIG. 17 shows a proximity sensor 1700 which comprises separate emitters 1701 and detectors 1702, in another example the same device can be used as both an emitter and a detector.

Figure 18:
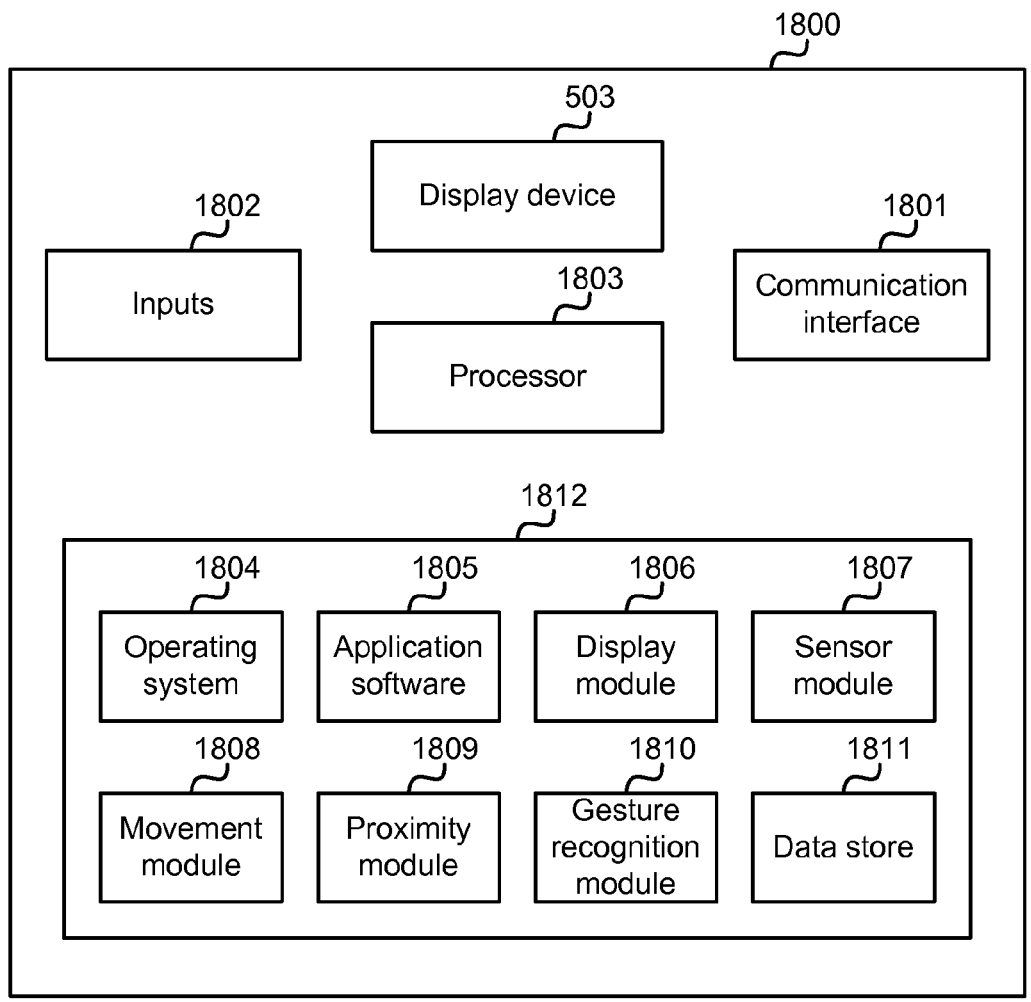
FIG. 18 illustrates an exemplary computing-based device in which embodiments of the pointing device with proximity sensing can be implemented.

FIG. 18 illustrates various components of an exemplary computing-based device 1800 which can be implemented as any form of a computing and/or electronic device, and in which embodiments of the techniques for using a pointing device with proximity sensing described herein can be implemented.

The computing-based device 1800 comprises a communication interface 1801, which is arranged to communicate with a pointing device having proximity sensing. The computing-based device 1800 also comprises one or more further inputs 1802 which are of any suitable type for receiving media content, Internet Protocol (IP) input or other data.

Computing-based device 1800 also comprises one or more processors 1803 which can be microprocessors, controllers or any other suitable type of processors for processing computing executable instructions to control the operation of the device in order to perform the techniques described herein. Platform software comprising an operating system 1804 or any other suitable platform software can be provided at the computing-based device to enable application software 1805 to be executed on the device. Other software functions can comprise one or more of:
- A display module 1806 arranged to control the display device 505, including for example the display of a cursor in a user interface;
- A sensor module 1807 arranged to read data from the movement sensor and proximity sensor;
- A movement module 1808 arranged to determine the movement of the pointing device from the movement sensor data;
- A proximity module 1809 arranged to read the proximity sensor data and determine the location and depth of objects in proximity to the pointing device;
- A gesture recognition module 1810 arranged to analyze the proximity sensor data and/or the movement sensor data and detect user gestures; and
- A data store 1811 arranged to store sensor data, images analyzed data etc.

The computer executable instructions can be provided using any computer-readable media, such as memory 1812. The memory is of any suitable type such as random access memory (RAM), a disk storage device of any type such as a magnetic or optical storage device, a hard disk drive, or a CD, DVD or other disc drive. Flash memory, EPROM or EEPROM can also be used.

An output is also provided such as an audio and/or video output to a display device 505 integral with or in communication with the computing-based device 1800. The display device 505 can provide a graphical user interface, or other user interface of any suitable type.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:
1. A pointing device, comprising:
a housing;
a movement sensor arranged in the housing to generate a first data sequence relating to sensed movement of the pointing device relative to a surface on which the pointing device is placed;
a proximity sensor arranged in the housing to generate a second data sequence relating to sensed movement of one or more objects in proximity to the surface on which the pointing device is placed relative to the pointing device, the proximity sensor further arranged to detect a multi-touch gesture, detecting the multi-touch gesture comprising detecting at least one user-manipulated object;

a tag sensor arranged to read a barcode or RFID tag associated with the one or more objects;

a processor located within the housing and configured to determine a control input from the first data sequence and the second data sequence; and the sensors being arranged such that a user can provide the first and second data sequences simultaneously using one hand.

2. The pointing device according to claim 1, wherein the proximity sensor comprises at least one emitter and at least one detector.

3. The pointing device according to claim 1, wherein the one or more objects comprise at least one of: a stylus; a pen; a brush; a further pointing device; or a mobile telephone.

4. The pointing device according to claim 1, wherein the proximity sensor comprises an illumination source arranged to illuminate the one or more objects, and a camera arranged to capture images of the one or more objects.

5. The pointing device according to claim 1, wherein the proximity sensor comprises at least one of: an optical proximity sensor; an ultrasonic proximity sensor; an inductive proximity sensor; an electrostatic proximity sensor; a capacitive proximity sensor; a thermal imaging sensor; an acoustic sensor; or a magnetic proximity sensor.

6. The pointing device according to claim 1, further comprising a projection device arranged to project a visual indication of an interaction zone in which the proximity sensor can sense the movement of the one or more objects.

7. The pointing device according to claim 1, further comprising a transmitter arranged to transmit an electrostatic signal into a first location of a hand of a user in contact with the pointing device, and wherein the proximity sensor is arranged to detect the electrostatic signal being emitted from a second location of the hand of the user, the first location being different from the second location.

8. The pointing device according to claim 1, further comprising a communication interface arranged to transmit the first and second data sequence to a user terminal.

9. The pointing device according to claim 1 wherein the second data sequence comprises a sequence of sensor images of the one or more objects, the sequence of sensor images being generated at least in part by ignoring background objects based at least in part on relative movement.

10. The pointing device according to claim 1 wherein the processor is further configured to control the launch of a software application or function in response to detection of a predefined object or code by at least one of the tag or proximity sensor.

11. One or more tangible device-readable media, the tangible device-readable media being hardware, with device-executable instructions comprising:

device-executable instructions to read data from a movement sensor of a pointing device and determine a movement of the pointing device relative to a surface on which the pointing device rests, the pointing device comprising at least one of:

a pointing device comprising a movement sensor, a proximity sensor, and a tag sensor arranged such that a user can provide a data sequence generated by the movement sensor and a data sequence generated by the proximity sensor simultaneously with one hand; or a computer mouse comprising an electrostatic proximity sensor arranged to detect a signal generated by the computer mouse traveling through at least a hand of the user and being emitted from one or more fingers of the user;

device-executable instructions to read data from a first proximity sensor of the pointing device and generate a sequence of first proximity sensor images of one or more objects in proximity to the surface on which the pointing device rests, wherein the one or more images are captured by the first proximity sensor;

device-executable instructions to analyze the first proximity sensor images to determine a movement of the one or more objects relative to the pointing device;

device-executable instructions to read data from at least one second proximity sensor, the at least one second proximity sensor located on the underside of the pointing device, and analyzing the data from the at least one second proximity sensor to determine at least a tilt of the pointing device; and device-executable instructions to control a position of a cursor in a user interface such that movement of the pointing device relative to the surface on which the pointing device rests causes a different displacement of the cursor than a corresponding movement of the one or more objects relative to the pointing device, the movement of the pointing device relative to the surface on which the pointing device rests and the corresponding movement having a same distance and a same direction.

12. One or more tangible device-readable media according to claim 11, further comprising:

device-executable instructions to analyze the movement of the one or more objects in proximity to the surface on which the pointing device rests; and device-executable instructions to identify a user gesture based on the analyzing the movement of the one or more objects.

13. One or more tangible device-readable media according to claim 12, further comprising:

device-executable instructions to control a software program in accordance with the identified gesture.

14. One or more tangible device-readable media according to claim 11, wherein the steps of reading data from the movement sensor and reading data from at least the first proximity sensor are performed substantially concurrently.

15. One or more tangible device-readable media according to claim 11, wherein the movement of the pointing device relative to the surface on which the pointing device rests causes a larger displacement of the cursor than a corresponding movement of the one or more objects relative to the pointing device.

16. One or more tangible device-readable media according to claim 11, wherein generating the sequence of first proximity sensor images of one or more objects in proximity to the pointing device comprises, for each first proximity sensor image in the sequence:

subtracting a background image from the proximity sensor image;

generating a processed version of the first proximity sensor image based on the subtracting;

locating the one or more objects in the processed version of the first proximity sensor image; and estimating a position of the one or more objects based on the locating.

17. One or more tangible device-readable media according to claim 16, wherein subtracting the background image from the first proximity sensor image comprises:

assigning a pixel value for each pixel in the first proximity sensor image;

comparing the pixel value to a predefined threshold;

in response to the comparing, setting the pixel color to black when the pixel value is less than or equal to the predefined threshold;

in response to the comparing, setting the pixel color to white when the pixel value is greater than the predefined threshold; and removing the black pixels from the first proximity sensor image.

18. One or more tangible device-readable media according to claim 17, wherein the generating the processed version of the first proximity sensor image based on the subtracting comprises:

analyzing the white pixels;

identifying one or more objects based on the analyzing; and labeling each of the identified one or more objects based on the identifying.

19. One or more tangible device-readable media according to claim 11, wherein the device-executable instructions are performed on a user terminal in communication with the pointing device.

20. A computer mouse, comprising:

a housing;

a movement sensor arranged with the housing to generate a first data sequence relating to sensed movement of the computer mouse relative to a supporting surface on which the computer mouse operates;

an electrostatic proximity sensor arranged with the housing to generate a second data sequence relating to sensed movement relative to the computer mouse of one or more fingers of a user in proximity to the supporting surface on which the computer mouse operates, the sensed movement of the one or more fingers being determined by the proximity sensor detecting a signal generated by the mouse, traveling through at least a hand of the user, and being emitted from the one or more fingers; and a processor located within the housing and configured to determine a control input from the first data sequence and the second data sequence.

* * * * *